United States Patent
Morita et al.

(10) Patent No.: US 6,644,569 B2
(45) Date of Patent: Nov. 11, 2003

(54) APPARATUS AND METHOD OF SUPPLYING POWDER COATING MATERIAL

(75) Inventors: Tadao Morita, Tokyo (JP); Hiroki Murai, Tokyo (JP); Masayuki Hajima, Tokyo (JP); Kazuhide Naruse, Aichi-ken (JP); Tadashi Suzuki, Aichi-ken (JP)

(73) Assignees: Nihon Parkerizing Co., Ltd., Tokyo (JP); Totota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/103,744

(22) Filed: Mar. 25, 2002

(65) Prior Publication Data

US 2002/0150677 A1 Oct. 17, 2002

(30) Foreign Application Priority Data

Mar. 27, 2001 (JP) ........................................ 2001-090183
Feb. 19, 2002 (JP) ........................................ 2002-041464

(51) Int. Cl.⁷ .............................. A01C 15/04; B61D 5/08
(52) U.S. Cl. ........................... 239/654; 239/67; 239/68; 239/71; 239/398; 239/407; 239/428; 239/429
(58) Field of Search .............................. 239/67, 68, 71, 239/398, 407, 408, 428, 429, DIG. 14, 654

(56) References Cited

U.S. PATENT DOCUMENTS

| 4,640,310 A | * | 2/1987 | Hartle et al. ................. 137/883 |
| 5,282,722 A | * | 2/1994 | Beatty ............................ 417/5 |
| 5,473,947 A | | 12/1995 | Buquet |
| 5,957,393 A | * | 9/1999 | Price .......................... 239/654 |

FOREIGN PATENT DOCUMENTS

WO     92/08177     5/1992

* cited by examiner

*Primary Examiner*—Robin O. Evans
(74) *Attorney, Agent, or Firm*—Wenderoth, Lind & Ponack, L.L.P.

(57) ABSTRACT

In an apparatus for supplying powder coating material, when a given supply rate Qm of powder coating material F and a carrier air flow rate Qt are inputted, whether learned data of a suction air pressure Pfm with respect to the inputted given supply rate Qm is stored in a memory or not is determined. If the data is stored, the learned data of the suction air pressure Pfm is read, and a pressure regulator for suction air is instantaneously operated to be adjusted to have the value of the read learned data. After that, the apparatus moves to PID control with the given supply rate Qm being the target value. The value of the suction air pressure Pfm when the actual supply rate equals the given supply rate Qm is stored in the memory as learned data.

6 Claims, 6 Drawing Sheets

APPARATUS AND METHOD OF SUPPLYING POWDER COATING MATERIAL

BACKGROUND OF THE INVENTION

1. Field of the Invention

The present invention relates to an apparatus and a method of supplying powder coating material, and more specifically, to improvement in response of an actual supply rate to a given supply rate.

2. Description of the Related Art

When powder coating such as coating of a car body is conducted, in order to make uniform the finished coating and to effectively use the coating material, it is necessary to always supply a constant amount of powder coating material to a coating gun. In a conventional apparatus for supplying powder coating material of this type, one end of a carrier tube is inserted in a tank for containing powder coating material. By blowing suction air into a nozzle of an injector provided on the other end of the carrier tube, the powder coating material in the tank is sucked into the carrier tube to be supplied to the coating gun. A measurement device for measuring the flow rate of the powder coating material is attached to the carrier tube. Based on the difference between the actual supply rate of the powder coating material which is measured by the measurement device and a given supply rate which is inputted via a control panel or the like, the pressure of the suction air to be blown into the nozzle of the injector is PID-controlled such that the actual supply rate equals the given supply rate. Here, PID control is a control system which is a combination of proportional operation for smooth control without hunting, integral operation for automatic correction of offset, and differential operation for improved response to disturbance. Such an apparatus for supplying powder coating material enables the coating gun to be always supplied with the given supply rate of powder coating material.

However, since it has been attempted to supply the given supply rate of powder coating material by PID control of the pressure of the suction air to be blown into the nozzle of the injector based on the difference between the actual supply rate and the given supply rate, when the proportional band of the PID control is set to be narrow, response of the actual supply rate to the given supply rate of powder coating material overshoots and oscillates as shown in FIG. 7 by a curve C1. On the other hand, when the proportional band is set to be wide, the response of the actual supply rate to the given supply rate of powder coating material is slow as shown in FIG. 7 by a curve C2. Therefore, as shown in FIG. 8, it takes time to obtain a desired suction air pressure and an actual supply rate in response to change in the given supply rate.

Users of powder coating who have to frequently change the discharge amount of powder coating material desire an apparatus for supplying powder coating material to be developed which can supply powder coating material to a coating gun with good response.

SUMMARY OF THE INVENTION

The present invention is made to solve the above problem. An object of the invention is to provide an apparatus and a method of supplying powder coating material with good response of an actual supply rate to a given supply rate.

An apparatus for supplying powder coating material according to the present invention comprises: a tank for containing powder coating material therein; an injector connected to the tank and having a main nozzle; a compressed air source for blowing suction air into the main nozzle of the injector to suck powder coating material from the tank; a powder flow rate measurement device for measuring a flow rate of powder coating material sucked by the injector and supplied from the tank; given supply rate input means for inputting a given supply rate of powder coating material; a suction air pressure regulator for adjusting a pressure of suction air blown into the main nozzle of the injector from the compressed air source; storing means; and a control circuit for storing in said storing means as learned data a value of suction air pressure with respect to a given supply rate in the past, for instantaneously operating, when a new given supply rate is inputted from the given supply rate input means, the suction air pressure regulator such that the suction air pressure equals a value of learned data stored in the storing means with respect to the new given supply rate, for adjusting thereafter the suction air pressure regulator such that a flow rate of powder coating material measured by the powder flow rate measurement device equals the new given supply rate to PID-control the suction air pressure.

A method of supplying powder coating material according to the present invention comprises the steps of: inputting a given supply rate; sucking powder coating material from a tank by blowing suction air into a main nozzle of an injector connected to the tank; measuring a flow rate of powder coating material; adjusting pressure of suction air blown into the injector such that the measured flow rate of powder coating material equals the inputted given supply rate; storing as learned data a value of suction air pressure with respect to a given supply rate in the past; and instantaneously adjusting, when a new given supply rate is inputted, the suction air pressure equals the value of learned data stored with respect to the new given supply rate, and thereafter PID-controlling the suction air pressure such that the measured flow rate of powder coating material equals the new given supply rate.

DETAILED DESCRIPTION OF THE PREFERRED EMBODIMENTS

Embodiments of the present invention are now described referring to the accompanying drawings.

Embodiment 1

Figure 1:
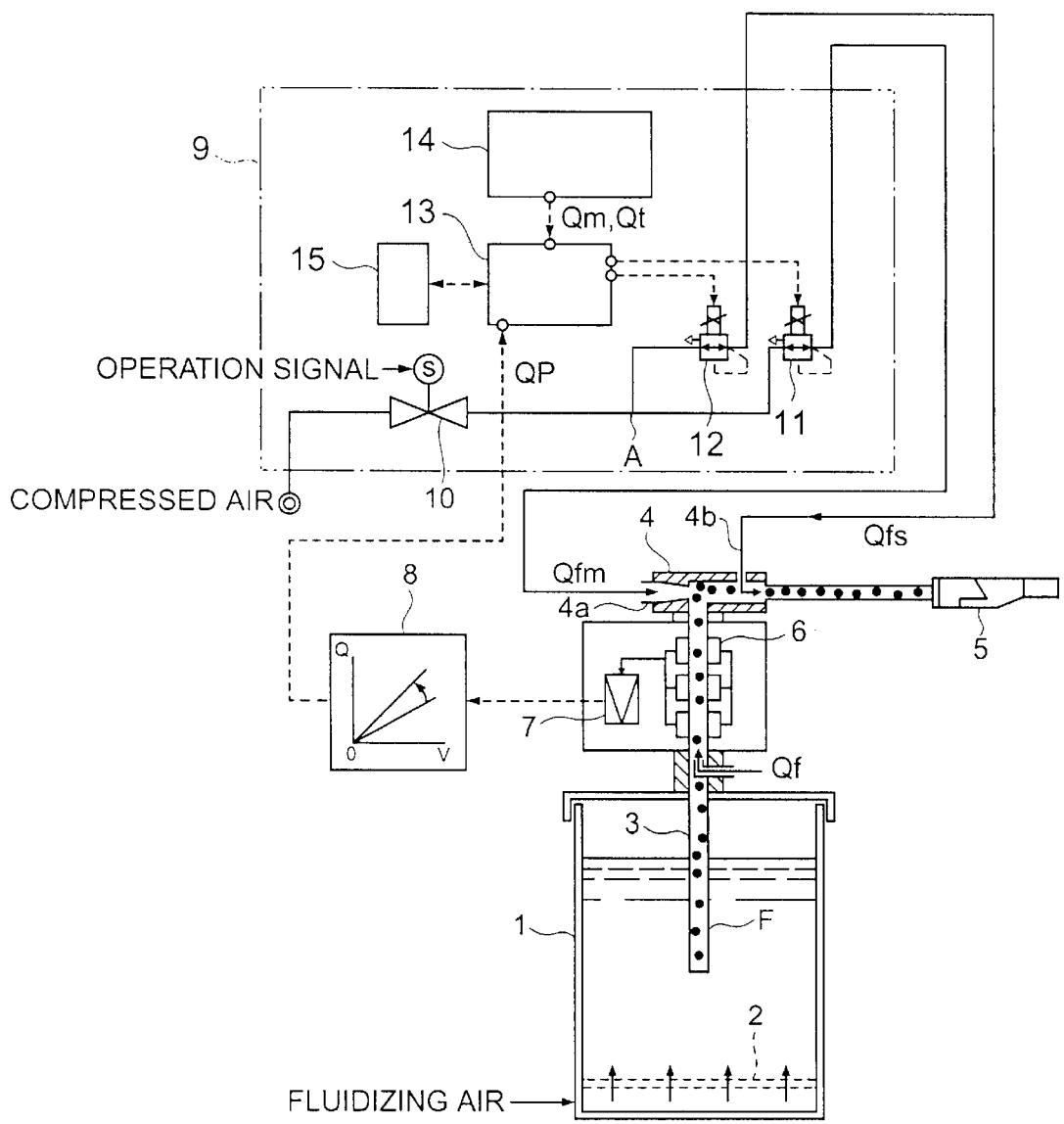
FIG. 1 is a block diagram of an apparatus for supplying powder coating material according to Embodiment 1 of the present invention.

FIG. 1 illustrates a structure of an apparatus for supplying powder coating material according to Embodiment 1 of the present invention. A tank 1 for containing powder coating material F is a so-called fluidized-bed tank provided with a perforated plate 2. Fluidizing air is blown in to hold the powder coating material F in a fluidized state within the tank 1. One end of a carrier tube 3 is inserted in the tank 1, while the other end of the carrier tube 3 is connected to an injector 4, which is connected to a coating gun 5. A powder flow rate measurement device 6 is attached to the carrier tube 3 for measuring the flow rate of the powder coating material F based on change in capacitance in the carrier tube 3. The powder flow rate measurement device 6 is connected to an amplifier circuit 7, which is in turn connected to a compensation circuit 8. Note that the powder flow rate measurement device 6 measures the flow rate of the powder coating material F based on the density in the carrier tube 3 measured as change in the capacitance and on a flow rate Qf of air for measurement introduced in the carrier tube 3. An output signal from the compensation circuit 8 is inputted to a controller 9, which supplies suction air and diluting air to a main nozzle 4a and a sub-nozzle 4b, respectively, of the injector 4.

The controller 9 is provided with a valve 10 which is connected to a compressed air source (not shown) and which is opened and closed based on an operation signal of the coating gun 5, and with a pressure regulator 11 for suction air and a pressure regulator 12 for diluting air which are respectively connected through a node A to the valve 10. The regulators 11 and 12 constitute a suction air pressure adjusting means and a diluting air pressure adjusting means, respectively, in the present invention, and are connected to the main nozzle 4a and the sub-nozzle 4b, respectively, of the injector 4. Further, the controller 9 has a control circuit 13 which is connected to the regulators 11 and 12 and to the compensation circuit 8. The controller 9 also has a control panel 14 and a memory 15 both of which are connected to the control circuit 13. Note that the control panel 14 constitutes a given supply rate input means and a carrier air flow rate input means in the present invention. The memory 15 stores as learned data a value of suction air pressure with respect to a given supply rate of the powder coating material F in the past, and constitutes a storing means in the present invention.

Next, basic operation of the apparatus for supplying powder coating material is described. First, fluidizing air is blown into the tank 1 to hold the powder coating material F in a fluidized state within the tank 1. When the coating gun 5 is operated, the valve 10 in the controller 9 is opened based on the operation signal. Compressed air from the compressed air source (not shown) passes through the pinch valve 10, and then, branches at the node A. Suction air is blown into the main nozzle 4a of the injector 4 through the pressure regulator 11 for suction air, while diluting air is blown into the sub-nozzle 4b of the injector 4 through the pressure regulator 12 for diluting air. Suction air blown into the main nozzle 4a sucks the powder coating material F from the tank 1 into the carrier tube 3. Further, suction air and diluting air supplies the powder coating material F into the coating gun 5 to be ejected toward an object to be coated.

Figure 2:
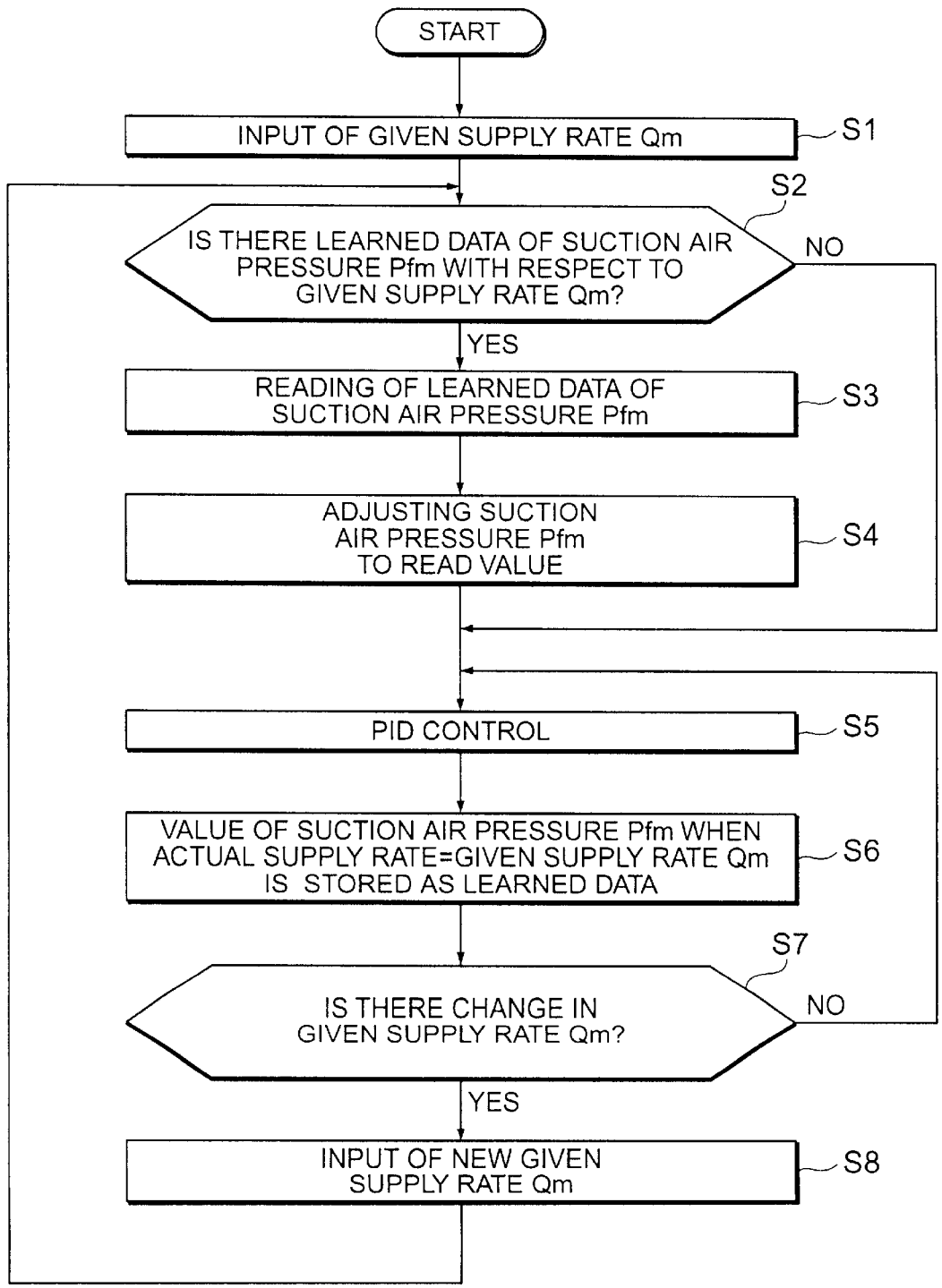
FIG. 2 is a flow chart illustrating the operation of Embodiment 1.

Here, the operation of the present embodiment is described further in detail referring to a flow chart of FIG. 2. First, at step S1, a given supply rate Qm of the powder coating material F and a carrier air flow rate Qt for carrying the powder coating material F to the coating gun 5 are inputted via the control panel 13. At step S2, the control circuit 13 determines whether learned data of a suction air pressure Pfm with respect to the inputted given supply rate Qm is stored in the memory 15 or not. If the data is stored in the memory 15, at step S3, the control circuit 13 reads the learned data of the suction air pressure Pfm, and then, at step S4, instantaneously operates the pressure regulator 11 for suction air to be adjusted to have the value of the read learned data.

After operation for a predetermined time period with the suction air pressure Pfm being adjusted to the value of the read learned data, at step S5, the system moves to PID control with the given supply rate Qm being the target value. More specifically, the pressure regulator 11 for suction air is adjusted by the control circuit 13 such that the flow rate of the powder coating material F measured by the powder flow rate measurement device 6 is the given supply rate Qm which is inputted at step S1.

Note that the powder flow rate measurement device 6 measures the flow rate of the powder coating material F based on the density in the carrier tube 3 measured as the change in the capacitance and on the flow rate Qf of air for measurement introduced in the carrier tube 3. An output signal from the powder flow rate measurement device 6 is amplified by the amplifier circuit 7, subjected to zero point compensation, for example, by the compensation circuit 8, and then, inputted to the control circuit 13 of the controller 9 as a signal representing a supply Qp of the powder coating material F. Here, the zero point compensation reduces the influence of powder attached to the inner wall of the carrier tube 3 while the powder coating material is supplied to an extent where there is practically no adverse effect. The zero point compensation compensates measurement values during operation with a measurement value after the apparatus for supplying powder coating material is stopped (a measurement value corresponding to the amount of powder attached to the carrier tube 3) being as a reference value of the compensation.

When the signal representing the supply Qp is inputted from the compensation circuit 8 to the control circuit 13, the control circuit 13 compares the supply Qp represented by the signal with the given supply rate Qm of the powder coating material F which is in advance inputted via the control panel 14, and controls the pressure Pfm of suction air blown into the main nozzle 4a of the injector 4 by adjusting the pressure regulator 11 for suction air according to the amount in excess of or less than the given supply rate Qm. This makes the given supply rate Qm of the powder coating material F always supplied to the coating gun 5. At the same time, the control circuit 13 calculates the difference Qt-Qfm between the carrier air flow rate Qt inputted via the control panel 14 and the flow rate Qfm of suction air, and adjusts the pressure regulator 12 for diluting air such that a flow rate Qfs of diluting air equals the difference.

Figure 3:
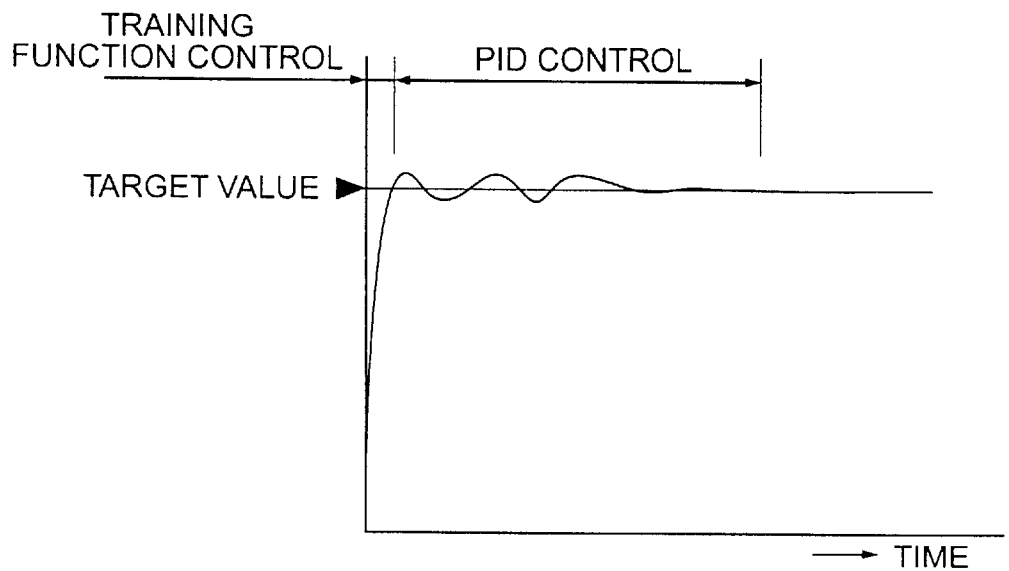
FIG. 3 is a graph illustrating response of actual supply rate in Embodiment 1.

In this way, since the system moves to PID control after the pressure regulator 11 for suction air is instantaneously operated based on the learned data in the past of the suction air pressure Pfm with respect to the given supply rate Qm of the powder coating material F, the actual supply rate can be made to be the given supply rate Qm in a short time as shown in FIG. 3.

At step S6, the value of the suction air pressure Pfm when the actual supply rate equals the given supply rate Qm is stored in the memory 15 as learned data by the control circuit 13.

Further, at step S7, whether there is a change in the given supply rate Qm of the powder coating material F or not is determined. When there is no change, the flow returns to step 5 to continue the PID control. When there is a change, a new given supply rate Qm is inputted at step S8, and the flow returns to step S2 to determine whether learned data of the suction air pressure Pfm with respect to the new given supply rate Qm is stored in the memory 15 or not.

It is to be noted that, at step S2, when the data of the suction air pressure Pfm with respect to the newly inputted given supply rate Qm is not stored in the memory 15, a decision is made that there is no learned data in the past. Then, the flow goes to step S5 to carry out the PID control with the given supply rate Qm being the target value.

Figure 4:
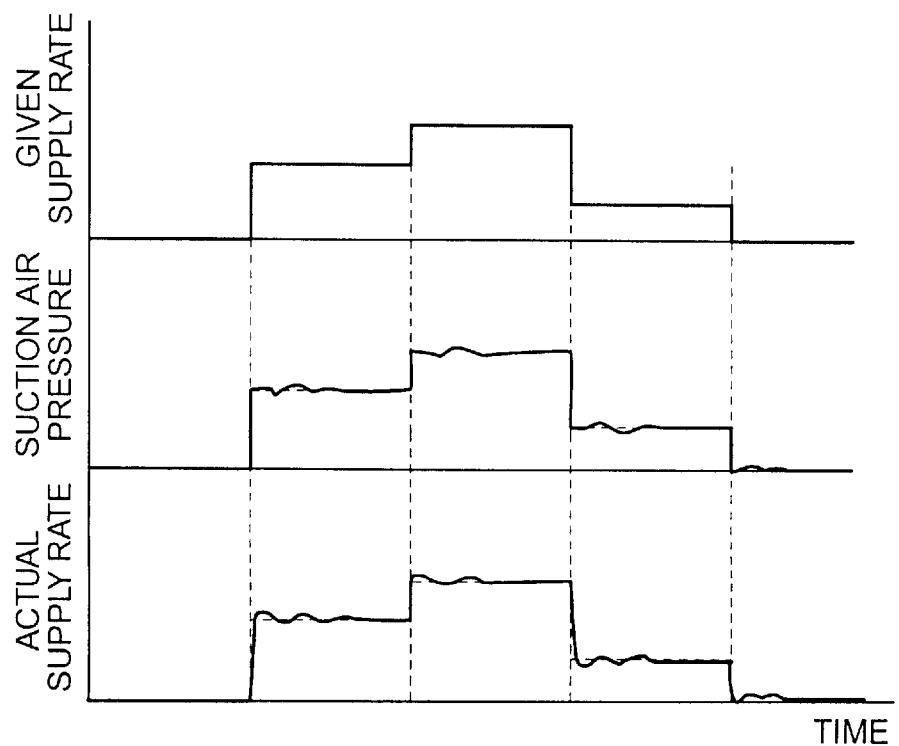
FIG. 4 is a timing chart illustrating the relationship between given supply rate, suction air pressure and actual supply rate in Embodiment 1.

As described above, by combining instantaneous operation of the pressure regulator 11 for suction air based on learned data in the past and PID control thereafter, the response of the actual supply rate to the given supply rate Qm is quite good even when the given supply rate Qm changes as shown in FIG. 4. Therefore, coating having a stable film thickness distribution can be formed.

It is to be noted that, though the pressure regulators are used as the suction air pressure regulator and the diluting air pressure regulator, respectively, the present invention is not limited thereto. For example, control valves may be used.

Embodiment 2

An apparatus for supplying powder coating material according to Embodiment 2 has a similar structure to that of the apparatus of Embodiment 1 shown in FIG. 1 except that, before the apparatus is operated, a calibration curve is formed for supplying powder coating material in advance by supplying an arbitrary supply of powder coating material, and, based on values of actual supply rate and suction air pressure when the calibration curve is formed, presumed data of suction air pressures with respect to respective set supplies are prepared and stored.

Figure 5:
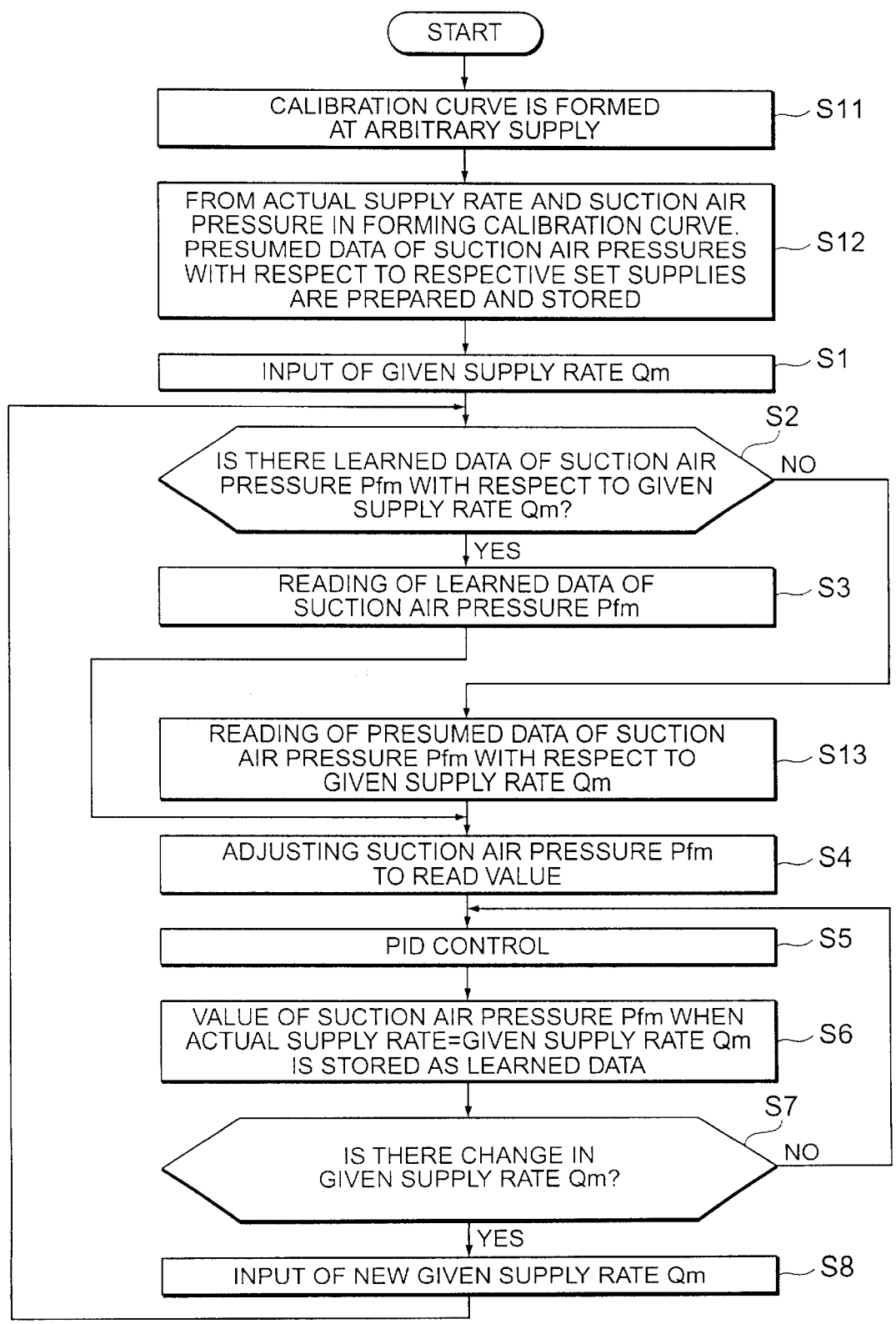
FIG. 5 is a flow chart illustrating the operation of Embodiment 2.
Figure 6:
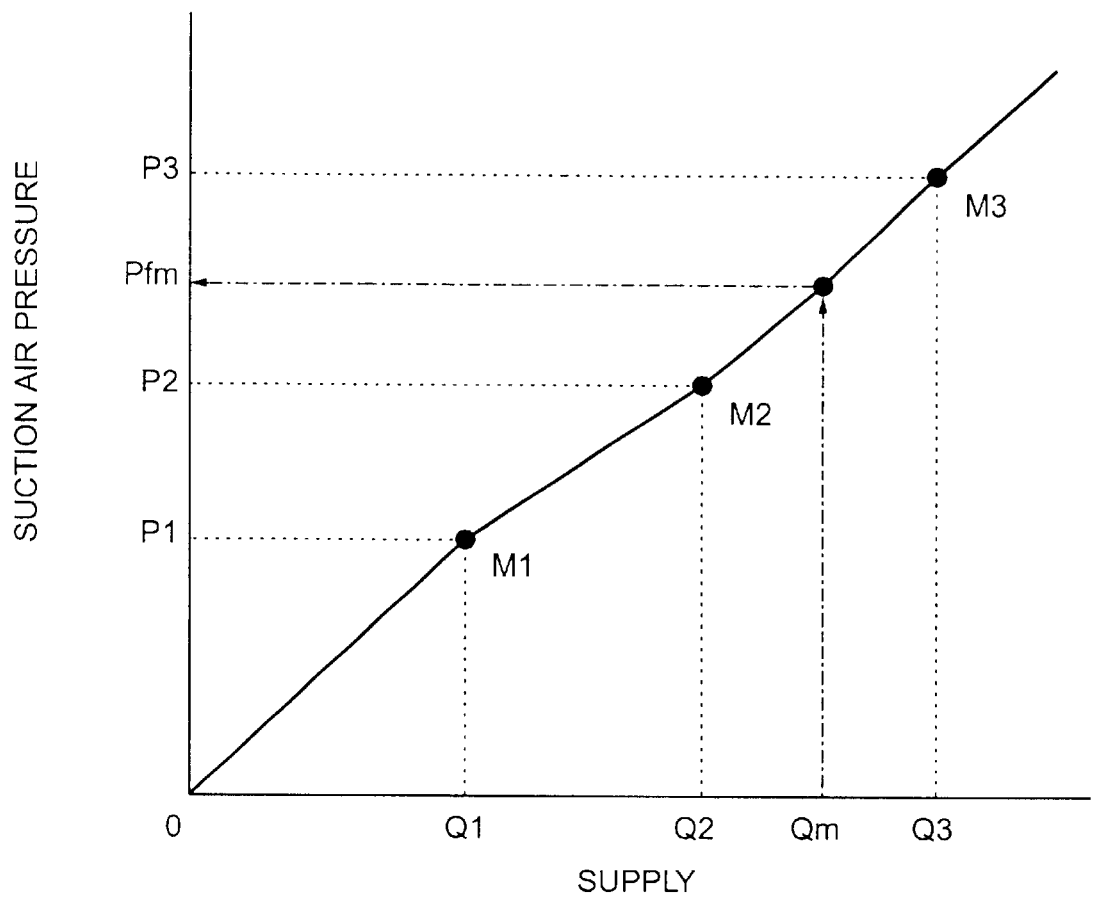
FIG. 6 is a graph illustrating the result of forming a calibration curve in Embodiment 2.
Figure 7:
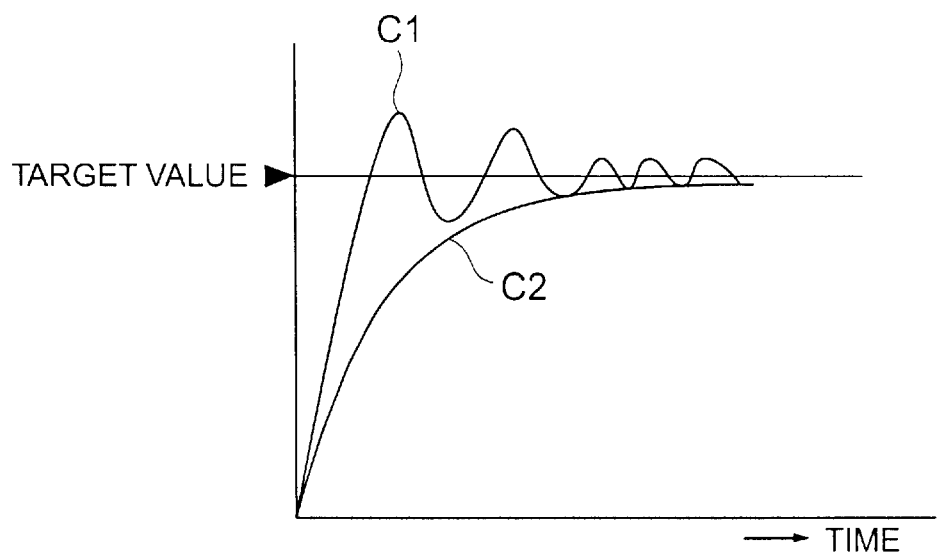
FIG. 7 is a graph illustrating response of actual supply rate in a conventional apparatus for supplying powder coating material.
Figure 8:
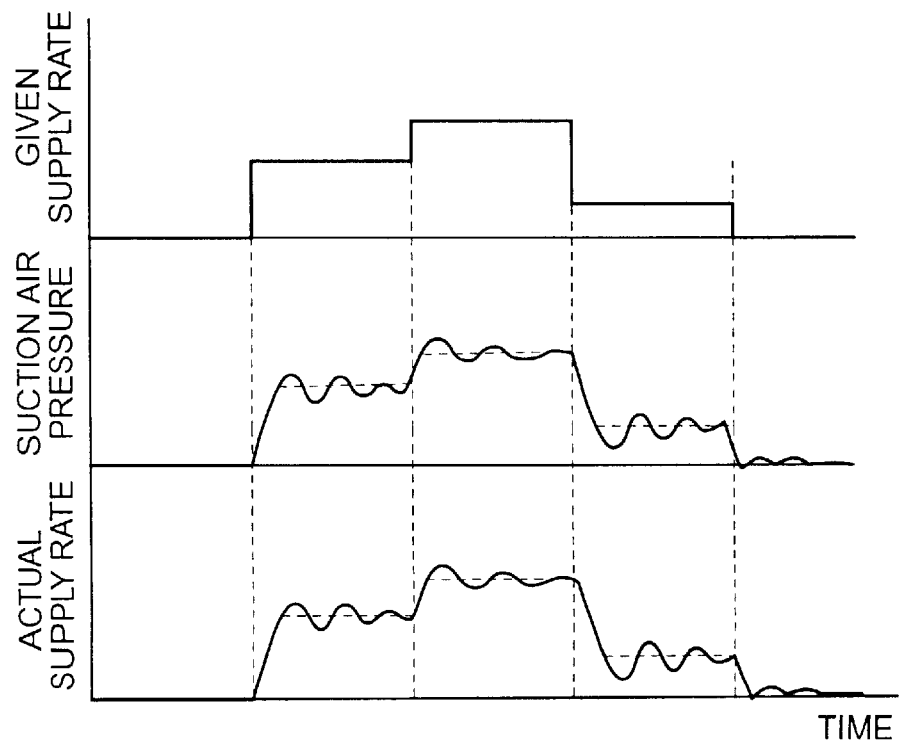
FIG. 8 is a timing chart illustrating the relationship between given supply rate, suction air pressure, and actual supply rate in the conventional apparatus for supplying powder coating material.

Operation of Embodiment 2 is now described referring to a flow chart of FIG. 5. First, at step 11, a calibration curve is formed. Here, as shown in FIG. 6, an arbitrary supply is specified to supply powder coating material, and a value of a suction air pressure P1 with respect to an actual supply rate Q1 is obtained. Similarly, values of suction air pressures P2 and P3 with respect to actual supplies Q2 and Q3, respectively, are obtained by forming a calibration curve. Interpolation is made by sequentially connecting an origin and measurement points M1 to M3 with straight lines. At step 12, the data is stored in the memory 15 as presumed data. It is to be noted that, with regard to a region where the supply is larger than Q3, the straight line connecting the measurement points M2 and M3 is extended to be used as the presumed data.

Subsequent Steps 1 to 3 are similar to those in Embodiment 1. More specifically, at step S1, a given supply rate Qm of the powder coating material F and a carrier air flow rate Qt are inputted. At step S2, the control circuit 13 determines whether learned data of a suction air pressure Pfm with respect to the inputted given supply rate Qm is stored in the memory 15 or not. If the data is stored in the memory 15, at step S3, the learned data of the suction air pressure Pfm is read.

If the learned data of the suction air pressure Pfm with respect to the inputted given supply rate Qm is not stored in the memory 15 in step S2, the flow goes to step S13 to read from the memory 15 the presumed data of the suction air pressure Pfm corresponding to the inputted given supply rate Qm.

Steps S4 to S8 thereafter are similar to those in Embodiment 1. More specifically, at step S4, the pressure regulator 11 for suction air is instantaneously operated to be adjusted to have the value of the above-described learned data read at step 3 or the value of the presumed data read at step 13. After operation for a predetermined time period in this state, at step S5, the system moves to PID control with the given supply rate Qm being the target value. At step S6, the value of the suction air pressure Pfm when the actual supply rate equals the given supply rate Qm is stored in the memory 15 as learned data. Further, at step S7, whether there is a change in the given supply rate Qm of the powder coating material F or not is determined. When there is no change, the flow returns to step 5 to continue the PID control. When there is a change, a new given supply rate Qm is inputted at step S8, and the flow returns to step S2.

As described above, in Embodiment 2, since the presumed data of the suction air pressures with respect to the respective set supplies are prepared and stored by forming the calibration curve at arbitrary supplies, when there is no learned data with respect to a newly inputted given supply rate, by instantaneously adjusting the suction air pressure to have the value of the presumed data stored with respect to the given supply rate, the response of the actual supply rate when the apparatus is started and when the given supply rate is changed is good.

It is to be noted that, though, in FIG. 6, the calibration curve is formed using the three measurement points, a calibration curve may be formed using at least one measurement point. When only one measurement point is used, presumed data can be prepared by connecting the measurement point and the origin with a straight line.

Further, the presumed data may be stored in the form of a linear equation, or may be stored in the form of a data map of suction air pressures with respect to respective set supplies.

Still further, though, in FIG. 6, the origin and the three measurement points are sequentially connected with different straight lines, the present invention is not limited thereto. It is also possible to find from an origin and a plurality of measurement points one approximate straight line or curve which is nearest to the origin and the measurement points and to use it as the presumed data.

As described above, according to the present invention, since values of the suction air pressure with respect to the set supplies in the past are stored as learned data, the suction air pressure is, when a new given supply rate is inputted, instantaneously adjusted to have a value in the learned data stored with respect to the given supply rate, and after that, the suction air pressure is PID-controlled such that the flow rate of powder coating material measured by the powder flow rate measurement device is the new given supply rate, the response of the actual supply rate when the apparatus is started and when the given supply rate is changed is good, and thus, powder coating can be carried out in a short time with good controllability.

What is claimed is:

1. An apparatus for supplying powder coating material, said apparatus comprising:

a tank for containing powder coating material therein;

an injector connected to said tank and having a main nozzle;

a compressed air source for blowing suction air into said main nozzle of said injector to suck powder coating material from said tank;

a powder flow rate measurement device for measuring a flow rate of powder coating material sucked by said injector and supplied from said tank given supply rate input means for inputting a given supply rate of powder coating material;

a suction air pressure adjusting means for adjusting a pressure of suction air blown into the main nozzle of said injector from said compressed air source;

storing means; and a control circuit including means for storing in said storing means as learned data a value of suction air pressure with respect to a given supply rate in the past, means for instantaneously operating, when a new given supply rate is inputted from said given supply rate input means, said suction air pressure adjusting means such that the suction air pressure equals a value of learned data stored in said storing means with respect to the new given supply rate, and means for adjusting thereafter said suction air pressure adjusting means such that a flow rate of powder coating material measured by said powder flow rate measurement device equals the new given supply rate to PID-control the suction air pressure.

2. An apparatus for supplying powder coating material according to claim 1 wherein:

said injector has a sub-nozzle into which diluting air is blown;

said apparatus further comprising a diluting air pressure adjusting means for adjusting pressure of diluting air blown from said compressed air source into the sub-nozzle of said injector, and carrier air flow rate input means for inputting a carrier air flow rate set value;

said control circuit PID-controlling diluting air pressure by adjusting said suction air pressure adjusting means and said diluting air pressure adjusting means such that the sum of a flow rate of suction air blown into the main nozzle of said injector and a flow rate of diluting air blown into the sub-nozzle of said injector equals the carrier air flow rate set value inputted from said carrier air flow rate input means.

3. An apparatus for supplying powder coating material according to claim 1 wherein said control circuit prepares and stores in said storing means presumed data of suction air pressures with respect to respective given supply rate based on values of actual supply rate and suction air pressure on a calibration curve formed in advance by supplying an arbitrary supply of powder coating material, instantaneously operates, when learned data with respect to a new given supply rate inputted from said given supply rate input means is not stored in said storing means, said suction air pressure adjusting means such that the suction air pressure equals a value of the presumed data stored in said storing means with respect to the given supply rate, and thereafter PID-controls the suction air pressure.

4. An apparatus for supplying powder coating material according to claim 1 wherein said tank is a fluidized-bed tank.

5. An apparatus for supplying powder coating material according to claim 1 wherein said suction air pressure adjusting means is a pressure regulator.

6. An apparatus for supplying powder coating material according to claim 2 wherein said diluting air pressure adjusting means is a pressure regulator.

* * * * *